2 Sheets--Sheet 1.

HENRY PETERSON.
Improvement in Band Saw-Mills.

No. 125,984. Patented April 23, 1872.

Witnesses:
A. W. Almqvist
Geo. W. Mabee

Inventor:
H. Peterson
per Mmm/C
Attorneys.

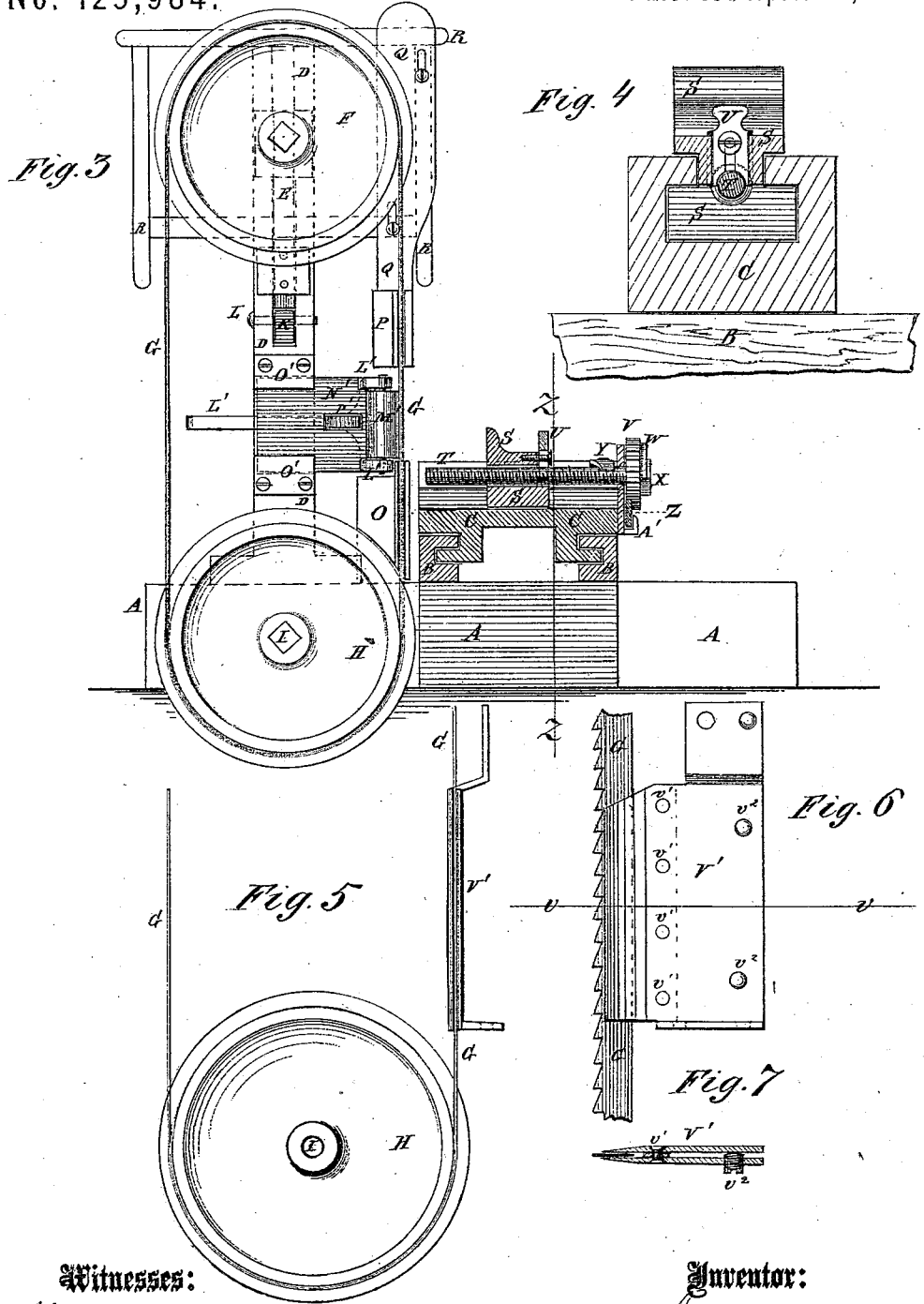

125,984

UNITED STATES PATENT OFFICE.

HENRY PETERSON, OF EAST GERMANTOWN, INDIANA.

IMPROVEMENT IN BAND-SAW MILLS.

Specification forming part of Letters Patent No. 125,984, dated April 23, 1872.

Specification describing a new and useful Improvement in Band-Saw Mills, invented by HENRY PETERSON, of East Germantown, in the county of Wayne and State of Indiana.

Figure 1:
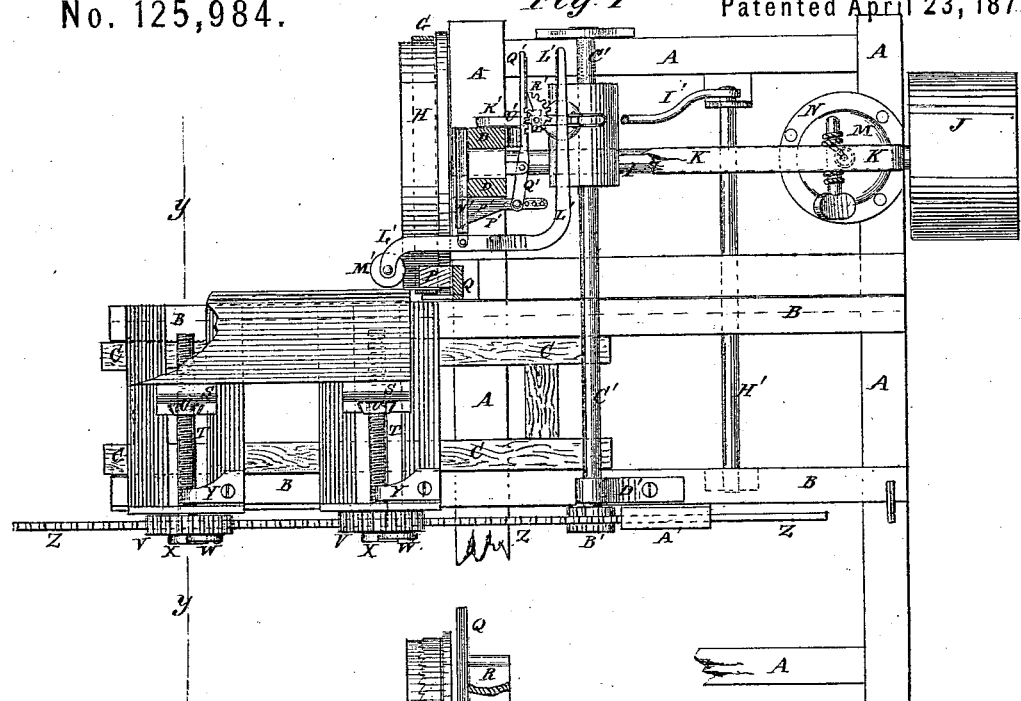
Figure 2:
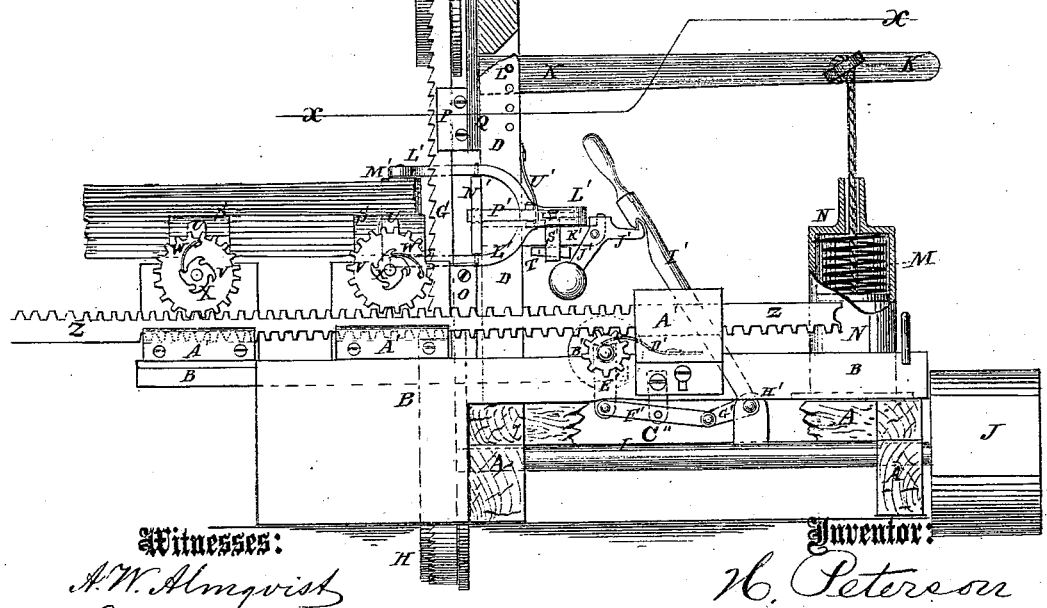

Figure 1, Sheet I, is a top view of my improved machine, partly in section, through the line $x\,x$, Fig. 2. Fig. 2, Sheet I, is a side view of the same, part being broken away to show the construction. Fig. 3, Sheet II, is an end view of the same, partly in section, through the line $y\,y$, Fig. 1. Fig. 4, Sheet II, is a detail sectional view of the same, taken through the line $z\,z$, Fig. 3. Fig. 5, Sheet II, is a detail front view of the saw-guide. Fig. 6, Sheet II, is a side view of the same. Fig. 7, Sheet II, is a detail sectional view of the same taken through the line $v\,v$, Fig. 6.

Similar letters of reference indicate corresponding parts.

My invention has for its object to furnish an improved band-saw mill for sawing boards, veneering, and other lumber, and which shall be simple in construction, convenient in use, and effective in operation, being easily adjusted, regulated, and controlled; and it consists in the construction and combination of the various parts of the machine, as is hereinafter more fully described.

A represents the frame of the saw-mill, to which is attached the ways B, in which the carriage C moves back and forth. To the frame A is attached the lower end of a post, D, which is slotted vertically to receive the sliding bearing E for the journal of the upper pulley F, around which the band-saw G passes. The saw G also passes around the pulley H, attached to the end of the driving-shaft I, which revolves in bearings in the frame A, and to which is attached a pulley, J, to receive the belt by which the power is applied. The pulleys F H are made with flanges, against which the rear edge of the band-saw G rests to hold it forward to its work. The lower end of the sliding bearing E rests upon the end of the lever K, which enters the slot of the post D, and is pivoted to said post by a pin or bolt, L, as shown in Figs. 2 and 3, several holes being made in said post E to receive the said pin or bolt L, so that the pulley F may be conveniently raised and lowered according to the length of the band-saw G. The outer end of the lever K is connected with a coiled spring, M, of sufficient strength to give the necessary tension to the saw G under ordinary circumstances, but which will yield to allow the saw to slip upon the lower or driving-pulley H should said saw strike an obstruction or stick in the timber. The spring M should be covered with a case, N, to protect it from sawdust and other obstructions that might interfere with its proper operation. The spring M should also be provided with a gauge or index, to indicate the amount of tension under which it may be. The part of the band-saw G that is passing through the timber is held in a vertical position by the guides O P, which receive its rear edge. The lower guide O is attached to the frame A, and should be of such a height as to reach to or nearly to the top of the carriage C. The upper guide P is attached to the lower end of a bar or plate, Q, which is adjustably attached to the frame R, attached to the upper part of the slotted post D, as shown in Fig. 3. The bar or plate Q may be secured to the frame R by screws or bolts passing through slots in said bar or plate Q, and into or through the said frame R, or by other suitable means that will allow it to be raised and lowered, as may be required, to adjust the guide P according to the thickness of the timber being sawn. The timber while being sawn rests upon the head and tail blocks of the carriage C and against the knees S. The lower part of the knees S is dovetailed, and fits into dovetailed grooves in the head and tail blocks of the carriage C. T are screws, the outer ends of which are swiveled to the outer ends of the head and tail blocks of the carriage C, and which pass through the lower parts of the knees S. The screws T are connected with the knees S by half nuts formed upon the lower ends of the slides U, adjustably attached to the knees S so that they may be readily raised to allow the knees S to be moved back to receive another log or other stick of timber, and lowered so that the knees S may be moved forward by turning the said screws T forward. V are gear-wheels, which run loosely upon the outer ends of the screws T, and are made to carry the said screws T with them when turned in the proper direction to turn the screws forward by spring-pawls W, attached to their outer sides, and which take hold of the ratchet-wheels X attached to the outer ends of the screws T. The screws are held against being turned back by the friction of the gear-wheels V, by spring-pawls Y, attached to the head and tail blocks of the carriage C, and which take hold of notches or teeth formed upon the said screws T. Z is a bar toothed upon its upper edge to mesh into the teeth of the gear-wheels V, and which rests and slides in guides A' attached to the carriage C and way B. Upon the lower edge of the bar Z are formed teeth for the teeth of the gear-wheel B' to mesh into. The gear-wheel B' is attached to the end of the shaft C', which revolves in bearings in the frame A, and is driven from the driving-shaft by a belt and pulleys, or by other suitable gearing. The toothed bar Z may be replaced, if desired, by an endless chain or rope. The outer end of the shaft C' is so arranged that it may be raised and lowered to throw the gear-wheel B' into and out of gear with the toothed bar Z. D' is a spring attached to the way B, and which rests upon the movable end of the shaft C' to throw and hold the said shaft C' down and the wheel B' out of gear with the bar Z when not in use. E' is a stud which passes up through a hole in the way B, against the lower side of the shaft C'. The lower end of the stud E' is pivoted to the end of the lever F', the middle part of which is pivoted to the way B, or to a support attached to said way. The other end of the lever F' is pivoted to the end of a short crank-arm, G', attached to or formed upon the end of the shaft H', which works in bearings attached to the frame A, and to the other end of which is attached a long crank arm or lever, I', having a notch or catch formed upon its upper part to catch upon the catch or hook of the upper end of the lever J', the lower end of which is weighted, and which is pivoted at its angle to the end of the arm or bracket K', rigidly attached to the post D. The weighted lever J' is so arranged that when left free it will hang in such a position that the lever I', when operated to throw the gear-wheel B' into gear with the toothed bar Z, will catch upon it and hold the said gear-wheel in gear with the said bar until released in the manner hereinafter described.

The weighted lever J' is tripped to release the lever I' by the outward movement of the end of the lever L', which rests upon the arm K', and is prevented from moving outward any further than to trip the said weighted lever J' by a stop formed upon the outer end of said arm K'. The lever L' is bent to pass around the post D, and its other end is branched, and has a roller, M', pivoted to and between the ends of the said branches. The branched end of the lever L' is pivoted to the end of a plate, N', which slides in a keeper, O', attached to the post D. The plate N' is slotted to receive a wedge, P', to the forward end of which is pivoted the end of the lever Q', several holes being formed in the said end of the wedge to receive the pivoting-pin to enable it to be adjusted according to the thickness of the strips to be sawn from the timber. The lever Q' is pivoted to the post D, and has teeth or notches formed in it to receive the teeth of the cam R', which is pivoted to a band, S', slipped upon the arm K', and which is adjustably secured in place by a wedge-key, T'. The free end of the lever Q' is held out against the toothed cam R' by a spring, U', attached to the post D. With this construction, when the lever I' is caught upon the weighted lever J' the gear-wheel B' moves the toothed bar Z, which turns the screws T, and moves the knees S, carrying the timber across the face of the saw G. When the timber has been moved laterally for a distance equal to the thickness of the strip to be sawn, it strikes the roller M' and operates the lever L' to release the lever I', when the spring D' at once throws the wheel B' out of gear with the bar Z.

When the mill is to be used for sawing veneering, the guides O P are detached and the guide V' is used. The guide V' consists of two plates connected to each other by a row of rivets, $v^1$, and provided with set-screws $v^2$, for adjusting said plates according to the thickness of the saw. The outer sides of the forward edges of the plates V' are beveled off, as shown in Fig. 7, so that the guide may readily follow the saw into the kerf. The upper end of one of the plates V' is attached to the frame R, and its lower end is attached to the frame A, the way B being moved away a little, if necessary.

Having thus described my invention, I claim as new and desire to secure by Letters Patent—

1. The combination of the shaft C', gear-wheel B', toothed bar Z, gear-wheels V, ratchet-wheels X, and pawls W and Y with the swiveled screws T that operate the knees S, substantially as herein shown and described, and for the purpose set forth.

2. The combination of the weighted catch-lever J', rigid arm K', forked lever L', roller M', sliding slotted plate N', sliding wedge P', toothed or notched lever Q', toothed cam R', and spring U' with the catch-lever I', shaft H', crank-arm G', lever F', and stud C'', for the purpose of throwing out of gear automatically the gearing for setting the timber up to the saw, substantially as herein shown and described.

HENRY PETERSON.

Witnesses:
J. H. RUHL,
H. R. RILEY.